United States Patent
Ivashin et al.

(10) Patent No.: US 7,908,147 B2
(45) Date of Patent: Mar. 15, 2011

(54) DELAY PROFILING IN A COMMUNICATION SYSTEM

(75) Inventors: Victor Ivashin, Danville, CA (US); Steve Nelson, San Jose, CA (US); Jamie C. Rasmussen, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 1360 days.

(21) Appl. No.: 11/410,414

(22) Filed: Apr. 24, 2006

(65) Prior Publication Data
US 2007/0258700 A1    Nov. 8, 2007

(51) Int. Cl.
*G10L 19/00*    (2006.01)
*H04L 12/28*    (2006.01)

(52) U.S. Cl. ........................................ 704/500; 370/351

(58) Field of Classification Search ........................ None
See application file for complete search history.

(56) References Cited

U.S. PATENT DOCUMENTS

| | | | |
|---|---|---|---|
| 5,565,923 A | 10/1996 | Zdepski | |
| 6,452,950 B1 | 9/2002 | Ohlsson et al. | |
| 6,542,550 B1* | 4/2003 | Schreiber | 375/240.26 |
| 6,658,027 B1 | 12/2003 | Kramer et al. | |
| 6,751,198 B1 | 6/2004 | McPherson et al. | |
| 6,862,298 B1 | 3/2005 | Smith et al. | |
| 6,891,573 B2 | 5/2005 | Schreiber et al. | |
| 6,975,992 B2* | 12/2005 | Tucker et al. | 704/273 |
| 2002/0101885 A1 | 8/2002 | Pogrebinsky et al. | |
| 2003/0066094 A1* | 4/2003 | van der Schaar et al. | 725/151 |
| 2005/0023343 A1* | 2/2005 | Tsuchinaga et al. | 235/382 |
| 2005/0058145 A1 | 3/2005 | Florencio et al. | |
| 2005/0237378 A1 | 10/2005 | Rodman | |

FOREIGN PATENT DOCUMENTS

| | | |
|---|---|---|
| JP | 11-205460 | 7/1999 |
| JP | 2006-340321 | 12/2006 |

* cited by examiner

*Primary Examiner* — Brian L Albertalli

(57) ABSTRACT

A method for a communication system comprising a plurality of communication modules passing an audio stream comprising frames of audio data comprises receiving the audio stream at one of the communication modules; selecting one of the frames; identifying second data; replacing a portion of the audio data in the one of the frames with the second data; and transmitting the audio stream comprising the one of the frames of audio data comprising the second data from the one of the communication modules in the communication system.

23 Claims, 13 Drawing Sheets

DELAY PROFILING IN A COMMUNICATION SYSTEM

BACKGROUND

The present invention relates generally to data communication. More particularly, the present invention relates to delay profiling in a communication system.

Voice conferencing systems and videoconferencing systems are becoming increasingly popular forms of communication. In such systems, the quality of the audio channel is paramount. Thus if these systems are to provide a positive participant experience, the delay between audio recording and audio playback must be small. If the delay is too large, participants will "talk over" each other, and a natural pace and flow of conversation cannot be maintained.

The audio channels of these conferencing systems are generally composed of many individual modules, each of which contributes to the overall delay of an audio frame as it travels through the system. Some modules may intentionally contribute large amounts of delay, for example, to compensate for network variability that would otherwise produce unacceptable audio quality. Or, a module might be computationally expensive, needing a lot of time to produce output from its input, and contributing a large amount to the overall delay in that way. In some cases, excessive delay in modules is caused by software bugs and can be corrected at design time. In other cases, the system acts correctly, but uses a configuration that is overly cautious for the actual installation environment.

Several conventional approaches exist for profiling an audio content channel. One conventional approach is roundtrip timing via loopback. In a typical voice conferencing system, the speech recorded from one user is played for the other conference participants but is not played for the person speaking, because doing so would produce a sound similar to a loud echo, which would be distracting. As a diagnostic, however, many voice conferencing systems have a loopback mode, where the speaking user's audio is played back to her after otherwise ordinary progression through the system. This provides a simple roundtrip delay metric that can be used by a single developer. The implementation can be as simple as speaking into a microphone and using a stopwatch to mark when the input is heard back. A more accurate implementation can have the conferencing client use its own timer to calculate the roundtrip delay of a uniquely identified audio packet. However, this approach has several disadvantages. First, only roundtrip time is measured, providing no indication of which individual system modules could be the source of problematic delay. Second, a received audio frame must be matched with a frame that was sent, which might require costly management and lookup of state information for every frame.

Another conventional approach is profiling using an alternate status channel. According to this approach, timing information is transmitted outside of the audio content channel. For example, a buffer might write information about the number of frames it contains to a file, or transmit that information to a central monitoring service. This approach also has several disadvantages. First, audio frames must be matched with frames that were sent, which might require costly management and lookup of state information for every frame. Second, the status channel can consume needed resources, affecting system behavior and invalidating the delay profiling information collected. For example, if a conferencing client and monitoring service use the same network interface, incoming status information might take up bandwidth needed for incoming audio. Third, it can be difficult to synthesize profiling information from multiple devices. A centralized clock may be required, or multiple clocks may need to be synchronized.

Another conventional approach is profiling by function timing, a generic tool for profiling a program's run-time behavior. In many programming languages, sequences of instructions are encapsulated in reusable functions. (Other terms for the same or similar mechanism include subroutine, method, procedure, etc.) When used, a function timing tool typically creates a special version of the target executable code, where the time each function is entered and left is recorded. Additional information such as the number of times each function is called can also be recorded. Function timing can help the programmer identify specific portions of the program's source files that are responsible for poor performance. However, this approach has several disadvantages. First, the divisions of statements into functions often do not correspond to the logical stages of audio frame manipulation. It can be difficult to extract information about individual or average frame performance, particularly when multiple threads of execution are involved. Second, system performance can be greatly affected, depending on the number and type of functions profiled. This can affect both objective and subjective assessments of delay. Third, it can be difficult to synthesize profiling information from multiple devices.

SUMMARY

In general, in one aspect, the invention features a method for a communication system comprising a plurality of communication modules passing an audio stream comprising frames of audio data, the method comprising: receiving the audio stream at one of the communication modules; selecting one of the frames; identifying second data; replacing a portion of the audio data in the one of the frames with the second data; and transmitting the audio stream comprising the one of the frames of audio data comprising the second data from the one of the communication modules in the communication system.

In some embodiments, the second data comprises a timestamp representing a time at which the one of the frames of the audio data is present in the one of the communication modules. Some embodiments comprise receiving the audio stream at a further one of the communication modules; generating a further timestamp representing a time at which the one of the frames of the audio data in the audio stream is present in the further one of the modules; replacing a further portion of the audio data in the one of the frames with the further timestamp; and transmitting the audio stream comprising the one of the frames of audio data comprising the timestamp and the further timestamp from the further one of the communication modules. Some embodiments comprise determining a delay for the one of the frames of the audio data based on the timestamp and the further timestamp. Some embodiments comprise encoding the audio stream, comprising receiving each of the frames at an encoder, generating coded frames based on the frames, comprising generating compressed frames of the audio data each having a predetermined size, comprising compressing the frames of the audio data, other than the one of the frames comprising the second data, and reducing the size of the one of the frames comprising the second data to the predetermined size, comprising discarding data, other than the second data, from the one of the frames comprising the second data, and then transmitting each of the coded frames from the encoder a predetermined interval after receiving the frame at the encoder. Some embodiments comprise decoding the audio stream, comprising receiving each of the frames at a decoder, generating uncoded frames based on the frames, comprising generating decompressed frames of the audio data each having a predetermined size, comprising decompressing the frames of the audio data, other than the one of the frames comprising the second data, and increasing the size of the one of the frames comprising the second data to the predetermined size, comprising adding data to the one of the frames comprising the second data, and then transmitting each of the uncoded frames from the decoder a predetermined interval after receiving the frame at the decoder. Some embodiments comprise generating the second data comprising identifying third data, selecting a coded value of one of a plurality of fixed points of a lossy codec according to a value of the third data, wherein the lossy codec has a plurality of the fixed points each associating one of the coded values with one of a plurality of uncoded values, and assigning, to the second data, the uncoded value of the one of the plurality of fixed points; wherein the frames are subsequently encoded by an instance of the lossy codec. Some embodiments comprise encoding the frames of audio data using the instance of the lossy codec. Some embodiments comprise generating the second data comprising identifying third data, selecting an uncoded value of one of a plurality of fixed points of a lossy codec according to a value of the third data, wherein the lossy codec has a plurality of the fixed points each associating one of the uncoded values with one of a plurality of coded values, and assigning, to the second data, the coded value of the one of the plurality of fixed points; wherein the frames are subsequently decoded by an instance of the lossy codec. Some embodiments comprise decoding the frames using the instance of the lossy codec. Some embodiments comprise an apparatus to perform the method. Some embodiments comprise a computer program for performing the method.

In general, in one aspect, the invention features a method comprising: receiving a data stream comprising frames of first data; identifying second data; selecting an uncoded value of a fixed point of a lossy codec, wherein the lossy codec has a plurality of the fixed points each associating one of a plurality of the uncoded values with one of a plurality of coded values, according to a value of the second data and a map associating each of a plurality of possible values of the second data with one of the uncoded values; replacing at least a portion of the first data in one of the frames with the selected uncoded value; wherein the frames are subsequently encoded by an instance of the lossy codec.

In some embodiments, the frames of the first data have been decoded by a further instance of the lossy codec before receiving the frames of the first data. Some embodiments comprise encoding the frames using the instance of the lossy codec. Some embodiments comprise decoding the frames using a further instance of the lossy codec; and recovering the second data, comprising recovering the uncoded value from the one of the first frames, and identifying the second data, in a further map associating each of the uncoded values with one of a plurality of data values, according to the uncoded value recovered from the one of the first frames. Some embodiments comprise an apparatus to perform the method. Some embodiments comprise a computer program for performing the method.

In general, in one aspect, the invention features a method comprising: receiving a data stream comprising frames of first data; identifying second data; selecting a coded value of a fixed point of a lossy codec, wherein the lossy codec has a plurality of the fixed points each associating one of a plurality of the coded values with one of a plurality of uncoded values, according to a value of the second data and a map associating each of a plurality of possible values of the second data with one of the coded values; replacing at least a portion of the first data in one of the frames with the selected coded value; wherein the frames are subsequently decoded by an instance of the lossy codec.

In some embodiments, the frames of the first data have been encoded by a further instance of the lossy codec before receiving the frames of the first data. Some embodiments comprise decoding the frames using the instance of the lossy codec. Some embodiments comprise encoding the frames using a further instance of the lossy codec; and recovering the second data, comprising recovering the coded value from the one of the first frames, and identifying the second data, in a further map associating each of the coded values with one of a plurality of data values, according to the coded value recovered from the one of the first frames. Some embodiments comprise an apparatus to perform the method. Some embodiments comprise a computer program for performing the method.

The details of one or more implementations are set forth in the accompanying drawings and the description below. Other features will be apparent from the description and drawings, and from the claims.

DETAILED DESCRIPTION

As used herein, the terms "client" and "server" generally refer to an electronic device or mechanism. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

In a real-time voice conferencing system, excessive delay between audio recording and audio playback will disrupt a conversation and result in a negative participant experience. Embodiments of the present invention can determine the amount of delay that a single audio frame accrues as it passes through a voice conferencing system's many constituent modules. The delays can then be remedied during further system development, or by manual or automatic real-time tuning of system parameters. Embodiments of the present invention utilize the existing audio content channel, which allows them to be easily incorporated into a system at an advanced phase of development, and to only negligibly impact system behavior and performance.

According to one aspect, embodiments of the present invention are useful in profiling delay in communication systems such as voice conferencing systems, videoconferencing systems, and the like. In particular, embodiments of the present invention replace at least a portion of the audio data in one or more of the audio frames with passenger data. The passenger data is then recovered at some later time during the frame's journey through the system. Preferably the passenger data placed in the frames is timing data, for example timestamps that represent a time at which the frame was present in the module of the system that inserted the timestamp. In other embodiments, the passenger data placed in the frames represents commands issued to some or all of the modules in the system. However, embodiments of the present invention are not limited by the nature of the passenger data placed in the frames.

According to one aspect, embodiments of the present invention are useful in transferring passenger data over a channel that is encoded and decoded using a codec. In some embodiments, the passenger data is inserted and recovered using a pseudo-codec that emulates the compression ratio and timing characteristics of the codec. In other embodiments, the codec is a lossy codec having fixed points, and the passenger data is inserted and recovered using a mapping between the data values and the fixed points.

Figure 1:
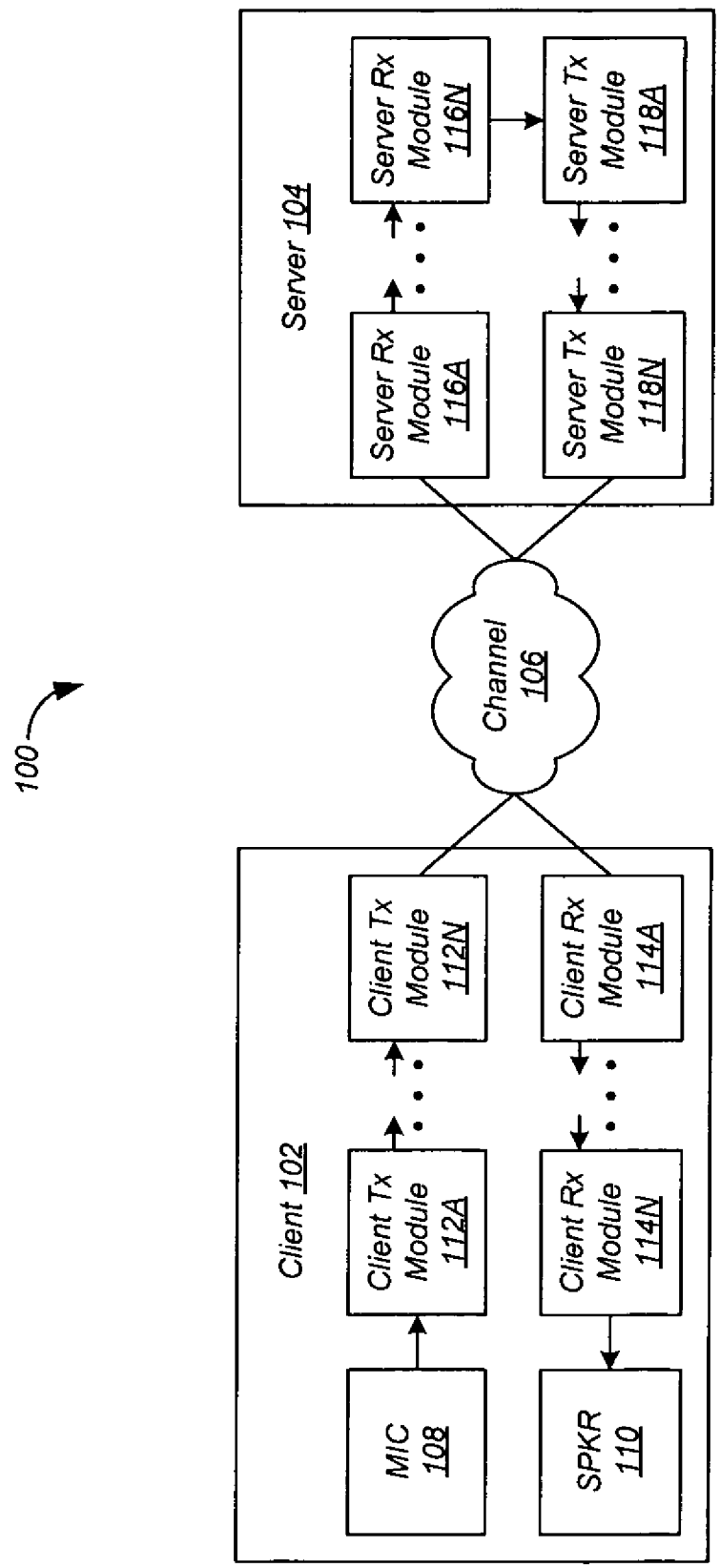
FIG. 1 shows a portion of an audio conferencing system in loopback mode.

FIG. 1 shows a portion of an audio conferencing system 100 in loopback mode. Audio conferencing system 100 comprises a client 102 and a server 104 in communication over a channel 106 such as a network. Client 102 comprises a microphone (MIC) 108, a speaker (SPKR) 110, a plurality of client transmit modules 112A-N, and a plurality of client receive modules 114A-N. Server 104 comprises a plurality of server receive modules 116A-N, and a plurality of server transmit modules 118A-N. Modules 112, 114, 116, and 118 can be implemented in hardware, software, or any combination thereof, and can perform any sort of function in audio conferencing system 100. For example, the modules can perform data buffering, silence detection, encoding, decoding, mixing and the like.

The loopback mode for audio conferencing system 100 is described because it is a convenient configuration for a single implementer to profile delay in system 100. However, embodiments of the present invention are not limited to this configuration, and as will be seen, many embodiments are well suited for use during actual operation of system 100.

Figure 2:
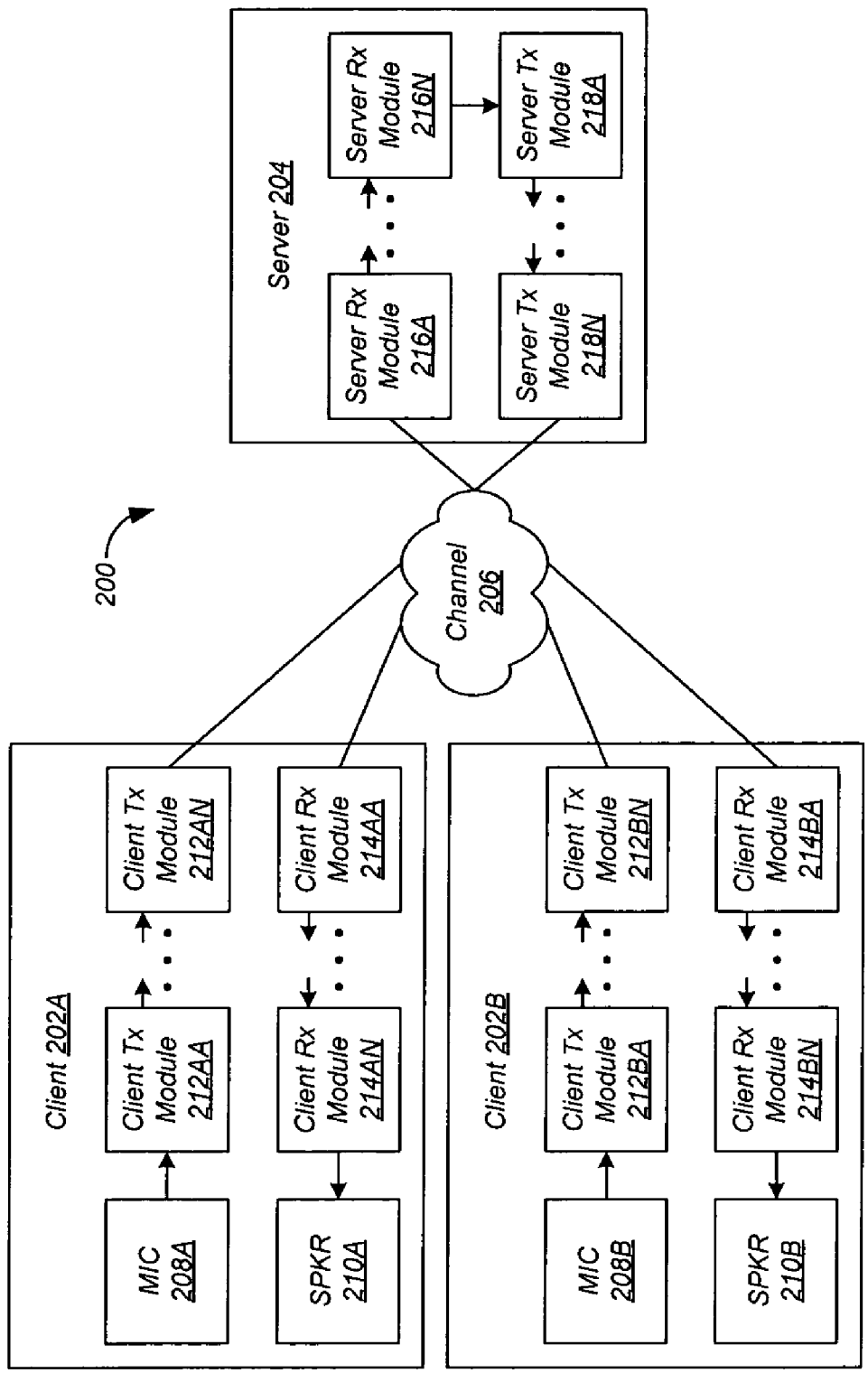
FIG. 2 shows an audio conferencing system comprising two clients and a server without loopback mode.

For example, FIG. 2 shows an audio conferencing system 200 comprising two clients and a server without loopback mode. Clients 202A,B and server 204 communicate over a channel 206 such as a network. Client 202A comprises a microphone 208A, a speaker 210A, a plurality of client transmit modules 212AA-AN, and a plurality of client receive modules 214AA-AN. Client 202B comprises a microphone 208B, a speaker 210B, a plurality of client transmit modules 212BA-BN, and a plurality of client receive modules 214BA-BN. Server 204 comprises a plurality of server receive modules 216A-N, and a plurality of server transmit modules 218A-N.

Figure 3:
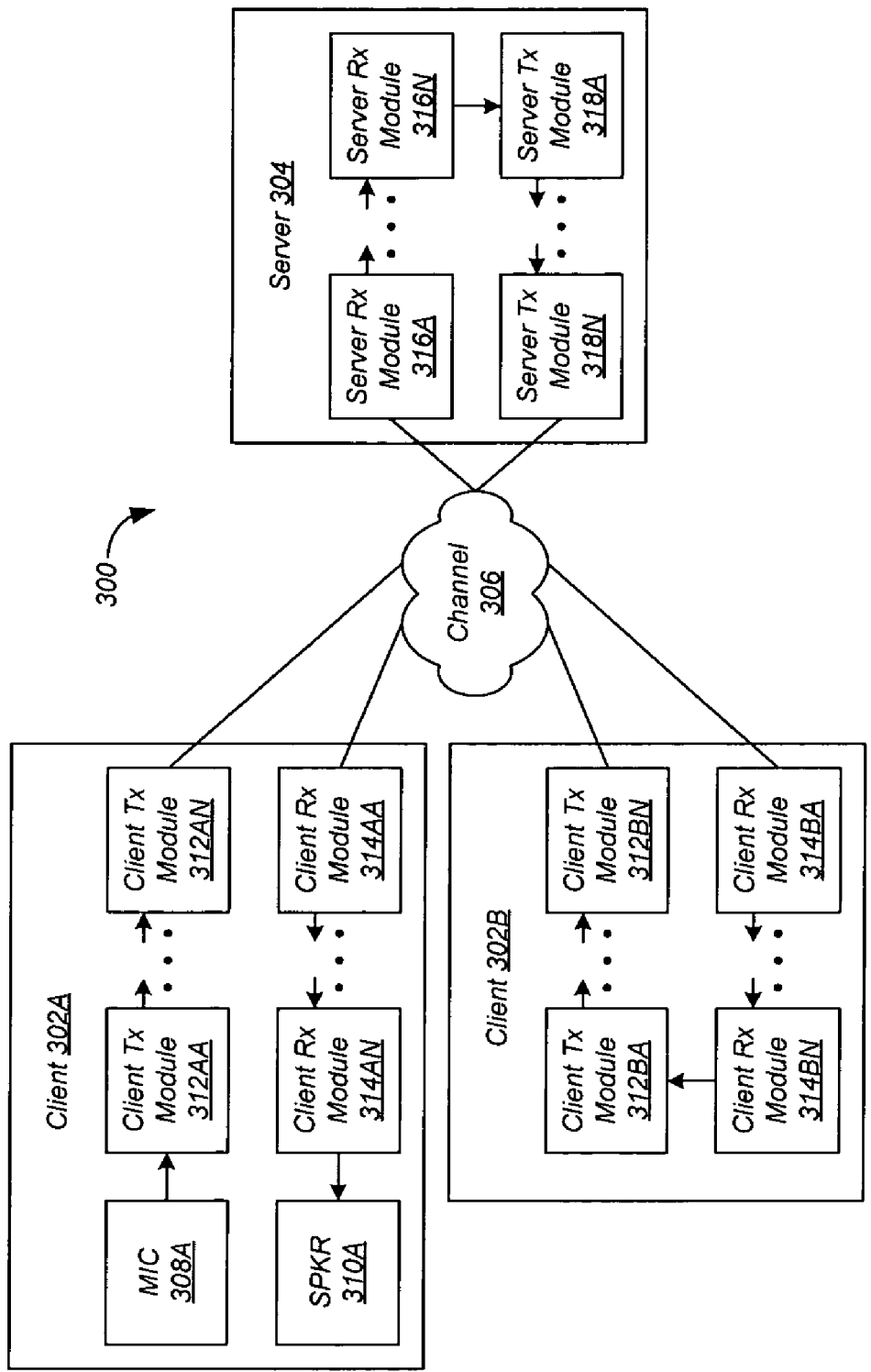
FIG. 3 shows an audio conferencing system comprising two clients and a server with one of the clients in loopback mode.

As another example, FIG. 3 shows an audio conferencing system 300 comprising two clients and a server with one of the clients in loopback mode. Clients 302A,B and server 304 communicate over a channel 306 such as a network. Client 302A comprises a microphone 308A, a speaker 310A, a plurality of client transmit modules 312AA-AN, and a plurality of client receive modules 314AA-AN. Client 302B comprises a plurality of client transmit modules 312BA-BN, and a plurality of client receive modules 314BA-BN. Server 304 comprises a plurality of server receive modules 316A-N, and a plurality of server transmit modules 318A-N.

Embodiments of the present invention are not limited to the configurations shown in FIGS. 1-3. Furthermore, embodiments of the present invention are not limited to audio conferencing systems, and can in fact be implemented in any system comprising an audio channel, for example including videoconferencing systems and the like.

Figure 4:
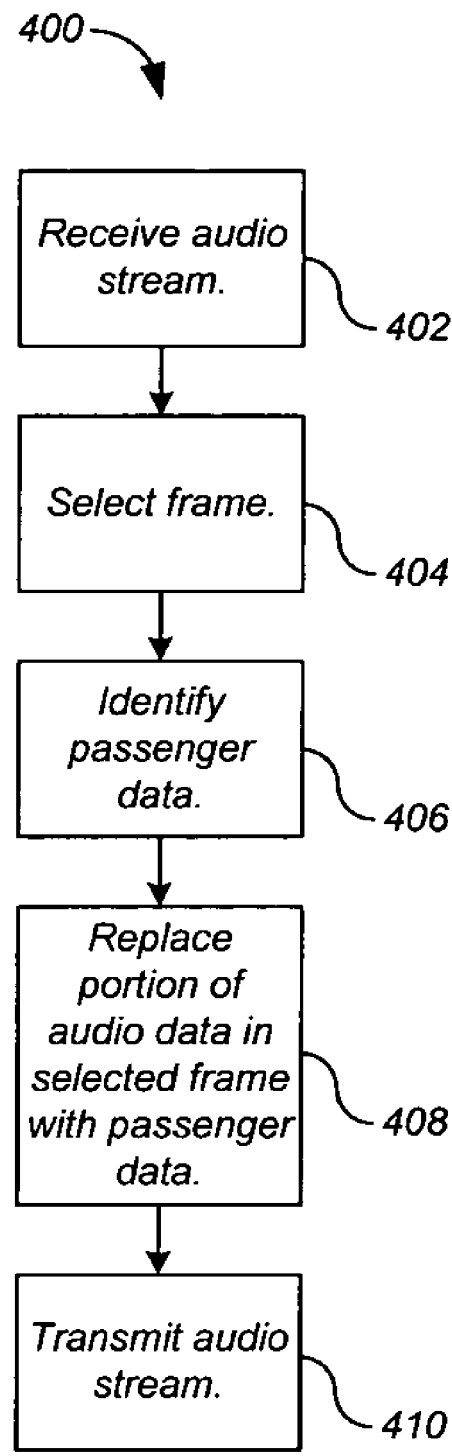
FIG. 4 shows a process for transferring passenger data over an audio channel according to a preferred embodiment of the present invention.

FIG. 4 shows a process 400 for transferring passenger data over an audio channel according to a preferred embodiment of the present invention. For example, process 400 can be implemented in any of the modules of the audio conferencing systems of FIGS. 1-3. The modules pass an audio stream comprising frames of audio data. Process 400 receives the stream of audio data at one of the modules (step 402), and selects one of the frames in the stream (step 404). Any selection technique can be used. For example, audio frames representing silence can be selected so that no useful audio content is lost.

Process 400 also identifies passenger data for insertion into the audio stream (step 406). According to some embodiments of the present invention, the passenger data comprises a timestamp representing a time at which the selected frame is present in the module. The timestamp can represent a time of day, a time that has elapsed since system initialization, and the like, which can also be synchronized with a central clock or subsequently corrected for local clock drift.

Process 400 replaces a portion (that is, some or all) of the audio data in the selected frame with the passenger data (step 408). Several techniques for replacing the audio data with the passenger data are discussed in detail below. Process 400 then transmits the audio stream from the module (step 410).

Figure 5:
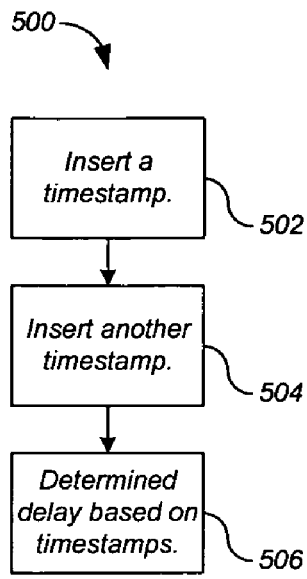
FIG. 5 shows a process for profiling delay in an audio conferencing system according to a preferred embodiment of the present invention.

FIG. 5 shows a process 500 for profiling delay in an audio conferencing system according to a preferred embodiment of the present invention. For example, process 400 can be implemented in any of the audio conferencing systems of FIGS. 1-3. Process 500 inserts a timestamp into a frame of audio data in an audio stream comprising a plurality of the frames at one of the modules in the audio conferencing system (step 502), preferably according to process 400 of FIG. 4. For convenience, this frame is now referred to as a "timestamp frame." Process 500 then inserts another timestamp into the timestamp frame at another of the modules in the audio conferencing system (step 504), also preferably according to process 400 of FIG. 4. Each timestamp represents a time at which the timestamp frame was present in the respective module of the audio conferencing system.

Figure 6:
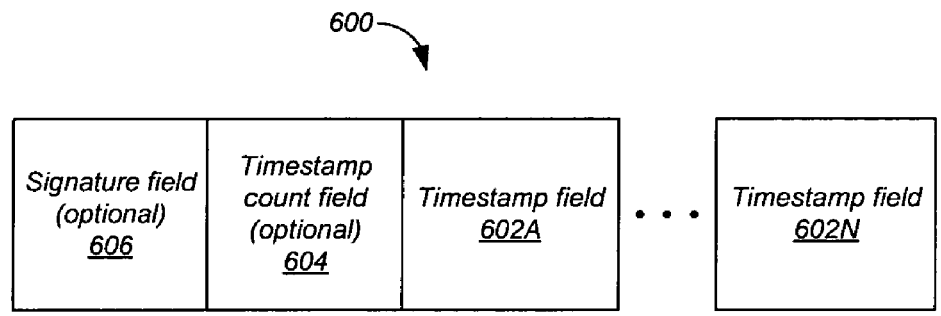
FIG. 6 shows a format of a timestamp frame according to a preferred embodiment.

FIG. 6 shows a format 600 of a timestamp frame according to a preferred embodiment. Format 600 defines a plurality of timestamp fields 602A-N, an optional timestamp count field 604, and an optional signature field 606. Each timestamp field 602 is preferably 8 bytes (64 bits) in length, though the length is not important, provided it offers sufficient resolution for the required measurement precision. An 8-byte timestamp is long enough to provide extremely precise measurements relative to the audio processing time scale where millisecond precision should suffice and 8 bytes is enough to identify any unique 100-nanosecond interval over a range of more than 58,000 years.

Optional timestamp count field 604 can be used to identify the number of timestamps that have been inserted into a timestamp frame, for example so that a module can insert a timestamp without overwriting other timestamps previously inserted into the timestamp frame. The timestamp count is preferably initialized to zero. Then when a module inserts a timestamp into a timestamp frame, the module also increments the timestamp count.

Because the timestamp frames are sent through the audio content channel, it is likely that various modules will interpret the data therein as encoded audio, for example, by playing the data through a loudspeaker. While process 500 is not affected as long as the passenger data is not modified as part of this processing, playing the passenger data back through a loudspeaker may produce random pops or crackle that will be distracting to users. Optional signature field 606 can be used to include a signature that identifies the timestamp frame as such. For example, the signature can be a set of coded byte values that is unlikely to occur naturally in recorded audio. Frames can be checked for this signature, and non-standard behavior can be triggered, such as playing silence instead of the passenger data in the timestamp frame. Optional signature field 606 is preferably 6 bytes (42 bits) in length, although other lengths can be used.

In some embodiments, the audio channel, including timestamp frames, is compressed according to the International Telecommunication Union (ITU) G.711 standard, and timestamps are inserted before compression, as described in further detail below. Given that G.711 compresses a two-byte value to one byte, and that a G.711 compressed audio frame is 240 bytes long, format 600 can be used to store 28 high-resolution timestamps, as shown in Equation 1, which should provide sufficient coverage for the important stages of processing in even a complex voice conferencing system.

$$\left\lfloor \frac{240 - 6 - 4}{8} \right\rfloor = 28 \quad (1)$$

Returning to FIG. 5, process 500 determines a delay for the timestamp frame based on the timestamps in the timestamp frame (step 506). For example, referring to FIG. 1, one of client transmit modules 112 can insert the first timestamp, and one of client receive modules 114 can insert the second timestamp. Then client 102 can determine a round-trip delay for the timestamp frame based on the two timestamps. Of course, more than two timestamps can be inserted into the timestamp frame by different modules, allowing for finer delay profiling such as determining the delay imposed by groups of modules or even individual modules.

As mentioned above, the various modules in a system may be clocked by different local clocks, each subject to clock drift due to oscillator variances and the like. Further, the clocks may not give the elapsed time from some fixed date, but instead reflect the elapsed time since the underlying operating system was restarted. This reference time can vary dramatically from device to device. If this effect is not compensated for, then meaningful delays can be calculated only within a single device. While this is often sufficient, in some situations it is desirable to calculate delays using timestamps from different devices. An intuitive but technically difficult solution is to use a common timekeeping service, or to periodically resynchronize all clocks with a canonical time source.

Embodiments of the present invention solves this problem in a different way, taking advantage of the fact that the audio conferencing system can be run on a local area network (LAN), and the time to transmit a packet from one device to another across a LAN is usually small. Using timestamp frame format 600 of FIG. 6, timestamps are added to a frame sequentially, and so by definition must be monotonically increasing in real (normalized) value. For purposes of description, it is assumed that there are only two devices in use, a client device and a server device, and that the system is configured for loopback behavior, for example as shown in FIG. 1. Client 102 is configured to insert a timestamp C1 immediately before transmitting a timestamp frame to server 104, and to insert another timestamp C2 immediately after receiving a timestamp frame from the server 104. Server 104 is configured to insert a timestamp S1 immediately after receiving a timestamp frame from client 102 and immediately before transmitting a timestamp frame to client 102. Assume the timestamps C1, C2, S1, and S2 for three such timestamp frames are given by Table 1.

TABLE 1

|  | C1 | S1 | S2 | C2 |
|---|---|---|---|---|
| Frame 1 | 0 | 6003 | 6009 | 10 |
| Frame 2 | 2 | 6007 | 6012 | 11 |
| Frame 3 | 5 | 6009 | 6014 | 12 |

While the time units are irrelevant, for simplicity, it is assumed the numbers in Table 1 are in seconds. It is also assumed that the clocks on the two devices have not significantly drifted over the course of a few frames. Let the difference between the reference time of the clock for client 102 and the clock for server 104 be K seconds. If K is known, the timestamps from one device can be normalized to have the same reference time as those from the other device. Therefore, the goal is to estimate K to within some small range. Because timestamps are added sequentially, the elapsed time between S1 and C1 is greater than or equal to zero. (Of course, the real elapsed time must be greater than zero, but because of our timer resolution, zero is a valid value.) Therefore the value S1−C1 immediately provides us with an upper bound on K, in this case 6003−0=6003. It is easy to see that K can not be 6004, meaning that time 0 on the client is time 6004 on the server, time 1 on the client is time 6005 on the server, etc. Because the S1 timestamp is 6003, K=6004 would mean the server added that timestamp at client time −1, meaning one second before C1 was written, which we know to be false. Similarly, the value S2−C2 provides a lower bound on the value of K, in this case 6009−10=5999. If K was 5998, then S2 would be the same as time 11 on the client, and we know that it must have been added some time before or equal to client time 10. Therefore, using only the timing information from Frame 1, the value of K is constrained to the range [5999, 6003].

Repeating this process for Frame 2 constrains K to the range [S2-C2, S1-C1]=[6012−11, 6007−2]=[6001, 6005]. Given that K is constant, the two ranges can be combined to get a single range that must be as good or better, in this case [6001−6003].

Repeating the process for Frame 3 constrains K to the range [6002, 6004], further constraining K to the range [6002, 6003]. In this manner, a very good estimate of K can be obtained using relatively few frames, and thereafter the timestamps inserted by server 104 can be normalized to the reference time of client 102 by simply subtracting K (for example using the lower bound of the range, here 6002). For illustration, Table 2 gives the normalized values obtained from the values in Table 1.

TABLE 2

|  | C1 | S1 | S2 | C2 |
| --- | --- | --- | --- | --- |
| Frame 1 | 0 | 1 | 7 | 10 |
| Frame 2 | 2 | 5 | 10 | 11 |
| Frame 3 | 5 | 7 | 12 | 12 |

Now using the normalized values, the deltas between any of the timestamps can be computed. And if a negative delta value is computed, it is clear that the value of K value has changed (for example due to clock drift), and the process described above can be used again to determine an updated estimate for K.

In audio channels, frames of digital audio data in an audio stream are generally encoded before transmission over a network, and then subsequently decoded at the receiver. According to some embodiments of the present invention, passenger data such as timestamps can be inserted into the audio stream, and recovered from the audio stream, at the encoding/decoding stage using a "pseudo-codec" that has characteristics similar to those of the codec used to encode/decode the audio data.

Figure 7:
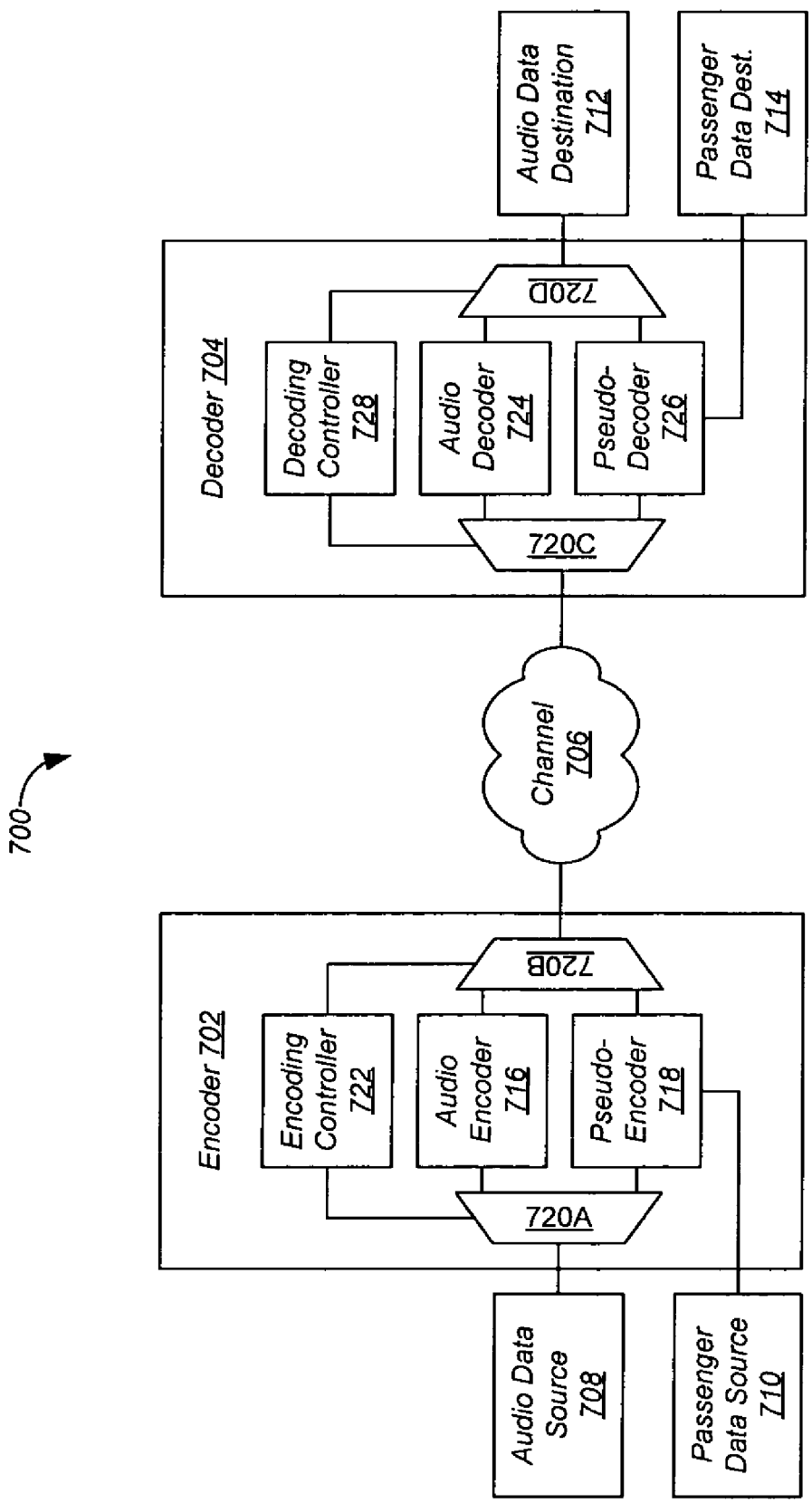
FIG. 7 shows a block diagram of an audio communication system employing a pseudo-codec according to a preferred embodiment of the present invention.

FIG. 7 shows a block diagram of an audio communication system 700 employing a pseudo-codec according to a preferred embodiment of the present invention. System 700 comprises an encoder 702 in communication with a decoder 704 over a channel 706 such as a data network for sending audio data provided by an audio data source 708 and passenger data provided by a passenger data source 710 to an audio data destination 712 and a passenger data destination 714, respectively. Encoder 702 comprises an audio encoder 716, a pseudo-encoder 718, and switches 720A,B under the control of an encoding controller 722. Decoder 704 comprises an audio decoder 724, a pseudo-decoder 726, and switches 720C,D under the control of a decoding controller 728. While system 700 is described in terms of inserting passenger data into an audio stream, other embodiments are capable of inserting passenger data into other sorts of data streams, as will be apparent to one skilled in the relevant arts after reading this description.

Figure 8:
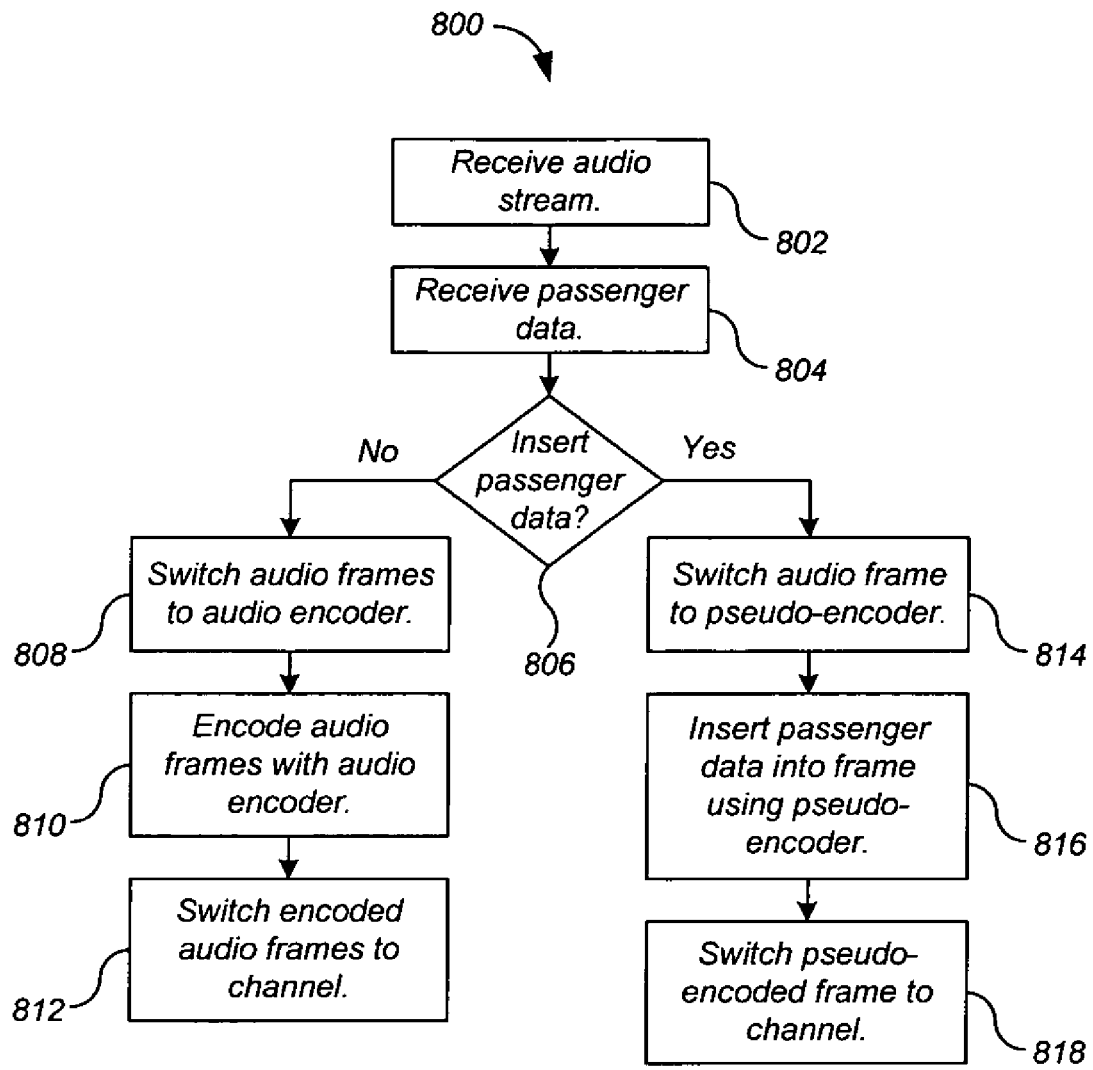
FIG. 8 shows a process for inserting data into an audio stream using a pseudo-codec according to a preferred embodiment of the present invention.

FIG. 8 shows a process 800 for inserting data into an audio stream using a pseudo-codec according to a preferred embodiment of the present invention, and is described with reference to system 700 of FIG. 7. Encoder 702 receives an audio stream of frames of audio data from audio data source 708 (step 802), and receives passenger data, for example timestamps, commands, and the like, from passenger data source 710 (step 804).

When no passenger data is to be inserted into the audio stream (step 806), encoding controller 722 causes switch 720A to switch the frames of audio data to audio encoder 716 (step 808), which encodes the audio data (step 810), for example according to conventional techniques. Preferably, the frames of audio data are compressed according to the ITU G.711 standard, although other standards can be used instead, such as G.729, MP3, LDP, and the like. Encoding controller 722 also causes switch 720B to pass the encoded frames of audio data from audio encoder 716 to channel 706 (step 812).

When passenger data is to be inserted into the audio stream (step 806), encoding controller 722 causes switch 720A to switch a frame of audio data to pseudo-encoder 718 (step 814), which inserts the passenger data into the frame (step 816). Encoding controller 722 can use any method to determine when passenger data is to be inserted into the audio stream. For example, encoding controller 722 can insert passenger data during intervals of silence, for example under the control of an optional silence detector (not shown). As further examples, encoding controller 722 can insert passenger data as it becomes available, at regular or random intervals, and the like.

Pseudo-encoder 718 also emulates the compression ratio and timing characteristics of audio encoder 716. Pseudo-encoder 718 reduces the size of the frame to the size of the frames produced by audio encoder 716, for example by discarding data, other than the passenger data, from the frame. Pseudo-encoder 718 emulates the timing of audio encoder 716 by transmitting each of the pseudo-coded frames a predetermined interval after receiving the frame, where the predetermined interval is the same as the interval required by audio encoder 716 to process a frame of audio data. Encoding controller 722 also causes switch 720B to pass the pseudo-coded frame from pseudo-encoder 718 to channel 706 (step 818).

Figure 9:
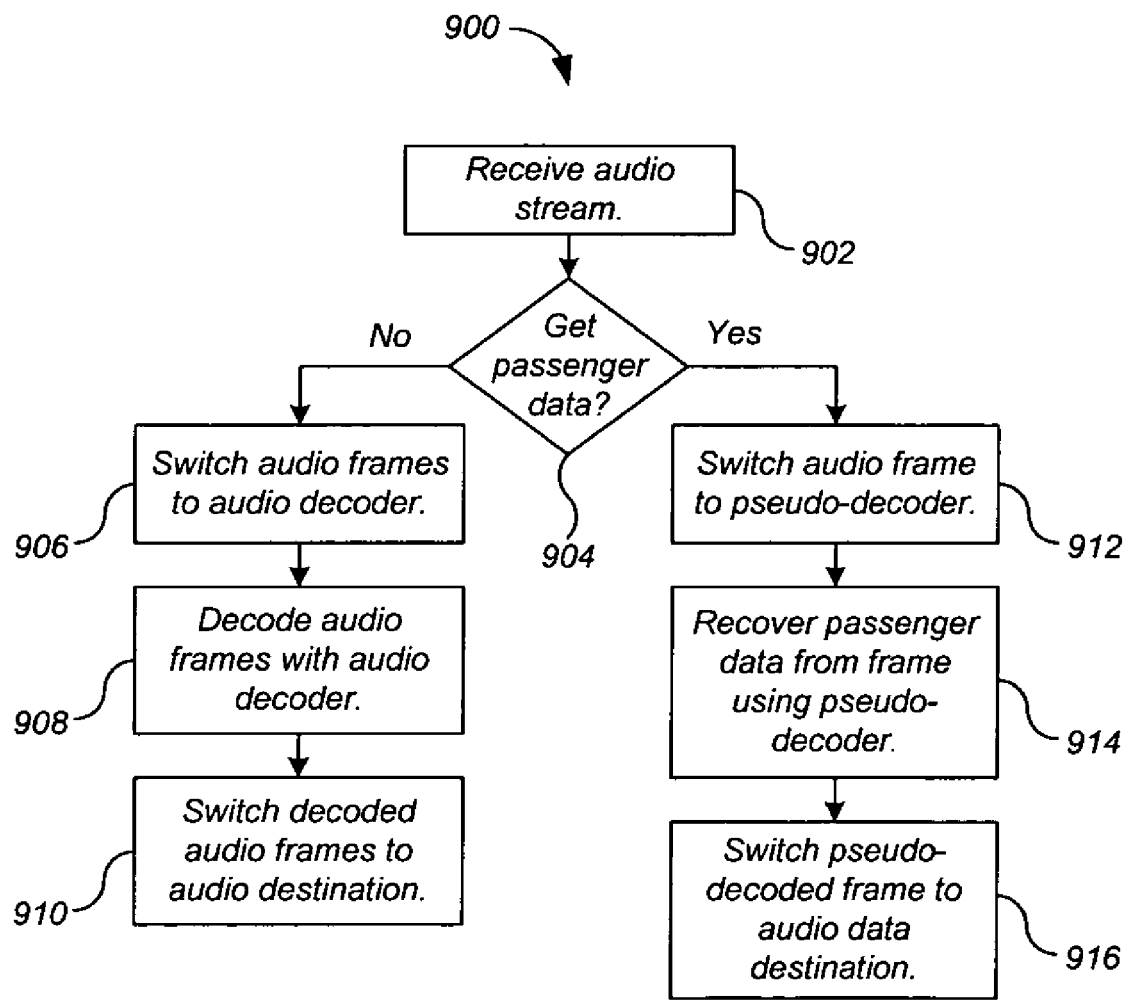
FIG. 9 shows a process for recovering data from an audio stream using a pseudo-codec according to a preferred embodiment of the present invention.

FIG. 9 shows a process 900 for recovering data from an audio stream using a pseudo-codec according to a preferred embodiment of the present invention, and is also described with reference to system 700 of FIG. 7. Encoder 702 receives an audio stream comprising frames of audio data and passenger data (step 902).

When frames of audio data are received (step 904), decoding controller 728 causes switch 720C to pass the frames of audio data to audio decoder 724 (step 906), which decodes the audio data (step 908), for example according to conventional techniques. Preferably, the frames of audio data are decompressed according to the ITU G.711 standard, although other standards can be used instead, such as G.729, MP3, LDP, and the like. Decoding controller 728 also causes switch 720D to pass the decoded frames of audio data from audio decoder 724 to audio data destination 712 (step 910).

When a frame of passenger data is received (step 904), decoding controller 728 causes switch 720C to pass the frame to pseudo-decoder 726 (step 912), which recovers the passenger data from the frame (step 914), and passes it to passenger data destination 714. Decoding controller 728 can use any method to determine when frames of passenger data are received. For example, each frame of passenger data can include a signature, such as the optional signature field 606 of FIG. 6, which decoding controller 728 can use to identify the frames. As another example, passenger data can be sent according to a predetermined schedule known to decoding controller 728, and the like.

Pseudo-decoder 726 emulates the compression ratio and timing characteristics of audio decoder 724. Pseudo-decoder 726 increases the size of the frame to the size of the frames produced by audio decoder 724, for example by adding data to the frame. Pseudo-decoder 726 emulates the timing of audio decoder 724 by transmitting each of the pseudo-decoded frames a predetermined interval after receiving the frame, where the predetermined interval is the same as the interval required by audio decoder 724 to process a frame of audio data. Decoding controller 728 also causes switch 720D to pass the pseudo-decoded frame from pseudo-decoder 726 to audio data destination 712 (step 916).

Embodiments of the present invention employing the pseudo-codec described above are especially useful when the pseudo-codec is easily integrated into the communication system. When that is not the case, embodiments of the present invention employing a lossy codec having fixed points that is already present in the communication system are especially useful. In lossy codecs, decoded data may be substantially different from the data that was originally encoded. For many applications, such as audio transmission, this is acceptable as long as the sounds produced are substantially similar.

However, some lossy codecs have fixed points, where the decoded data is identical to the data that was originally encoded, and where the relationship between the coded and uncoded values is 1:1. That is, each fixed point associates a particular coded value with a particular uncoded value. The codec always decodes the coded value for a fixed point as the corresponding uncoded value for that fixed point, and always encodes the uncoded value for a fixed point as the corresponding coded value for that fixed point. According to some embodiments of the present invention, passenger data is inserted into, and recovered from, both coded and uncoded frames using fixed points of a lossy codec. While embodiments of the present invention are described in terms of the ITU G.711 μ-law variant, other variants and codecs having fixed points can be used.

Figure 10:
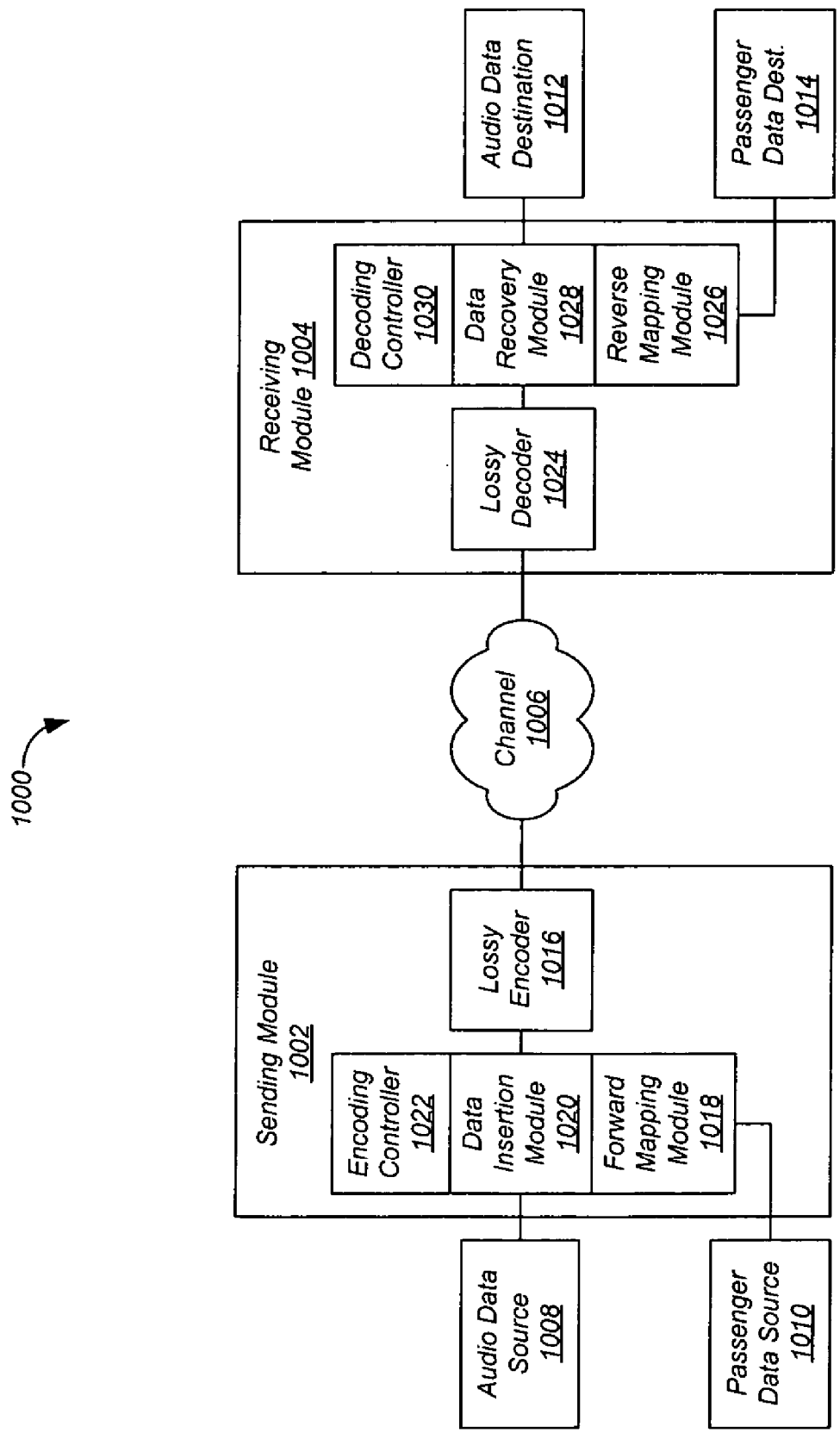
FIG. 10 shows a block diagram of an audio communication system employing a lossy codec having fixed points according to a preferred embodiment of the present invention.

FIG. 10 shows a block diagram of an audio communication system 1000 employing a lossy codec having fixed points according to a preferred embodiment of the present invention. System 1000 comprises a sending module 1002 in communication with a receiving module 1004 over a channel 1006 such as a data network for sending audio data provided by an audio data source 1008 and passenger data provided by a passenger data source 1010 to an audio data destination 1012 and a passenger data destination 1014, respectively. Sending module 1002 comprises a lossy audio encoder 1016 having fixed points, a forward mapping module 1018, and a passenger data insertion module 1020 under the control of an encoding controller 1022. Receiving module 1004 comprises a lossy audio decoder 1024 having the same fixed points as lossy audio encoder 1016, a reverse mapping module 1026, and a passenger data recovery module 1028 under the control of a decoding controller 1030. While system 1000 is described in terms of inserting passenger data into an audio stream, other embodiments are capable of inserting passenger data into other sorts of data streams, as will be apparent to one skilled in the relevant arts after reading this description.

Figure 11:
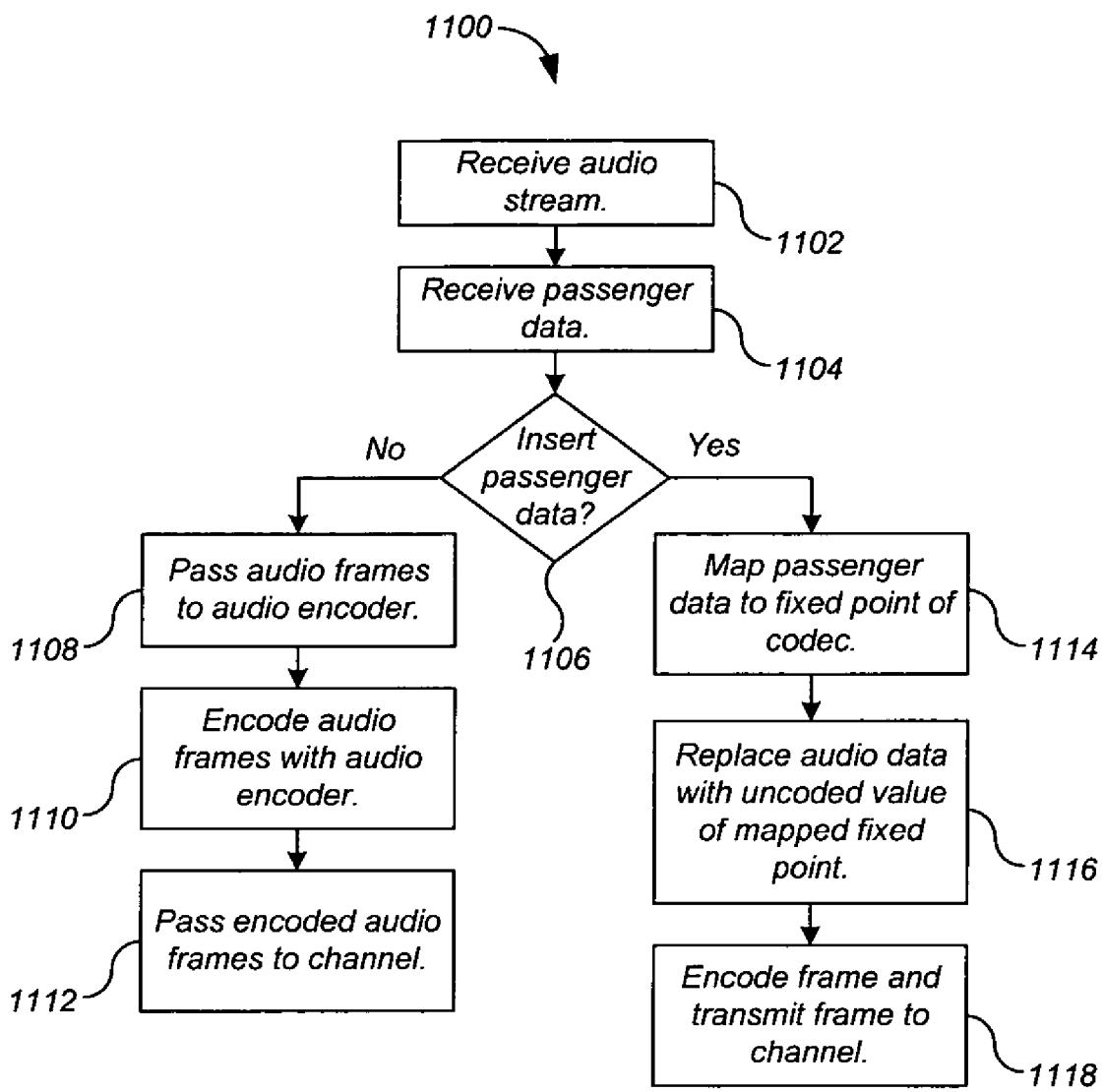
FIG. 11 shows a process for inserting data into an audio stream using a lossy codec having fixed points according to a preferred embodiment of the present invention.

FIG. 11 shows a process 1100 for inserting data into an audio stream using a lossy codec having fixed points according to a preferred embodiment of the present invention, and is described with reference to system 1000 of FIG. 10. While process 1100 is described in terms of inserting passenger data into an audio stream, other embodiments are capable of inserting passenger data into other sorts of data streams, as will be apparent to one skilled in the relevant arts after reading this description.

Sending module 1002 receives an audio stream of frames of audio data from audio data source 1008 (step 1102), and receives passenger data, for example timestamps, commands, and the like, from passenger data source 1010 (step 1104). In some cases, the frames of audio data have been decoded by an instance of the lossy codec before the frames are received.

When no passenger data is to be inserted into the audio stream (step 1106), encoding controller 1022 causes data insertion module 1020 to pass the frames of audio data to audio encoder 1016 (step 1108), which encodes the audio data (step 1110), for example according to conventional techniques. Preferably, the frames of audio data are compressed according to the ITU G.711 standard, although other standards can be used instead, such as G.729, MP3, LDP, and the like. Audio encoder 1016 passes the encoded frames of audio data to channel 1006 (step 1112).

When passenger data is to be inserted into the audio stream (step 1106), forward mapping module 1018 maps the passenger data to one of the fixed points of lossy encoder 1016 (step 1114). Preferably, forward mapping module 1018 selects an uncoded value of a fixed point of lossy encoder 1016 according to a value of the passenger data and a forward map associating possible values of the passenger data with the uncoded values.

By way of illustration, Table 3 presents such a forward map for the fixed points of the ITU G.711 μ-law variant according to a preferred embodiment of the present invention. Table 3 contains the uncoded values of the 255 fixed points arranged in order of increasing value, and maps them, in that order, to passenger data values 0-254. Note that each byte of passenger data is mapped to a two-byte fixed point encoded value. To map a passenger data value to a fixed point uncoded value, select the row corresponding to the passenger data value's tens place, and the column corresponding to the passenger data value's ones place. The fixed-point uncoded value is found in the cell where the row and column intersect.

TABLE 3

|  | 0 | 1 | 2 | 3 | 4 | 5 | 6 | 7 | 8 | 9 |
| --- | --- | --- | --- | --- | --- | --- | --- | --- | --- | --- |
| 0 | −32,124 | −31,100 | −30,076 | −29,052 | −28,028 | −27,004 | −25,980 | −24,956 | −23,932 | −22,908 |
| 10 | −21,884 | −20,860 | −19,836 | −18,812 | −17,788 | −16,764 | −15,996 | −15,484 | −14,972 | −14,460 |
| 20 | −13,948 | −13,436 | −12,924 | −12,412 | −11,900 | −11,388 | −10,876 | −10,364 | −9,852 | −9,340 |
| 30 | −8,828 | −8,316 | −7,932 | −7,676 | −7,420 | −7,164 | −6,908 | −6,652 | −6,396 | −6,140 |
| 40 | −5,884 | −5,628 | −5,372 | −5,116 | −4,860 | −4,604 | −4,348 | −4,092 | −3,900 | −3,772 |
| 50 | −3,644 | −3,516 | −3,388 | −3,260 | −3,132 | −3,004 | −2,876 | −2,748 | −2,620 | −2,492 |
| 60 | −2,364 | −2,236 | −2,108 | −1,980 | −1,884 | −1,820 | −1,756 | −1,692 | −1,628 | −1,564 |
| 70 | −1,500 | −1,436 | −1,372 | −1,308 | −1,244 | −1,180 | −1,116 | −1,052 | −988 | −924 |
| 80 | −876 | −844 | −812 | −780 | −748 | −716 | −684 | −652 | −620 | −588 |
| 90 | −556 | −524 | −492 | −460 | −428 | −396 | −372 | −356 | −340 | −324 |
| 100 | −308 | −292 | −276 | −260 | −244 | −228 | −212 | −196 | −180 | −164 |
| 110 | −148 | −132 | −120 | −112 | −104 | −96 | −88 | −80 | −72 | −64 |

TABLE 3-continued

|     | 0      | 1      | 2      | 3      | 4      | 5      | 6      | 7      | 8      | 9      |
|-----|--------|--------|--------|--------|--------|--------|--------|--------|--------|--------|
| 120 | −56    | −48    | −40    | −32    | −24    | −16    | −8     | 0      | 8      | 16     |
| 130 | 24     | 32     | 40     | 48     | 56     | 64     | 72     | 80     | 88     | 96     |
| 140 | 104    | 112    | 120    | 132    | 148    | 164    | 180    | 196    | 212    | 228    |
| 150 | 244    | 260    | 276    | 292    | 308    | 324    | 340    | 356    | 372    | 396    |
| 160 | 428    | 460    | 492    | 524    | 556    | 588    | 620    | 652    | 684    | 716    |
| 170 | 748    | 780    | 812    | 844    | 876    | 924    | 988    | 1,052  | 1,116  | 1,180  |
| 180 | 1,244  | 1,308  | 1,372  | 1,436  | 1,500  | 1,564  | 1,628  | 1,692  | 1,756  | 1,820  |
| 190 | 1,884  | 1,980  | 2,108  | 2,236  | 2,364  | 2,492  | 2,620  | 2,748  | 2,876  | 3,004  |
| 200 | 3,132  | 3,260  | 3,388  | 3,516  | 3,644  | 3,772  | 3,900  | 4,092  | 4,348  | 4,604  |
| 210 | 4,860  | 5,116  | 5,372  | 5,628  | 5,884  | 6,140  | 6,396  | 6,652  | 6,908  | 7,164  |
| 220 | 7,420  | 7,676  | 7,932  | 8,316  | 8,828  | 9,340  | 9,852  | 10,364 | 10,876 | 11,388 |
| 230 | 11,900 | 12,412 | 12,924 | 13,436 | 13,948 | 14,460 | 14,972 | 15,484 | 15,996 | 16,764 |
| 240 | 17,788 | 18,812 | 19,836 | 20,860 | 21,884 | 22,908 | 23,932 | 24,956 | 25,980 | 27,004 |
| 250 | 28,028 | 29,052 | 30,076 | 31,100 | 32,124 | X      |        |        |        |        |

The ITU G.711 μ-law variant presents a complication because it comprises only 255 fixed points, while a data byte can have any of 256 values. One solution is to simply discard any passenger data byte having a value of 255. For example, when using a format such as format 600 of FIG. 6 that includes a timestamp count field 604, a module can zero out the timestamp count in field 604 whenever a timestamp value of 255 is encountered. When the timestamp frame is processed to profile delay, the timestamp count will be less than expected, which causes the timestamp frame to be discarded. Discarding such a timestamp frame is acceptable because such an occurrence is rare, and other timestamp frames are soon available.

As an illustrative example, Table 4 shows how process 1100 could map the string "ERDIMX" by mapping the ASCII value of each letter, using Table 3, to a fixed point uncoded value. Table 4 also shows the result of G.711 compression of the resulting fixed-point value. Referring to Tables 3 and 4, to encode the letter "E" forward mapping module 1018 selects an uncoded value of one of the fixed points of Table 3 according to the ASCII value "69", which here is "−1,564".

TABLE 4

|                           | Letter |      |        |        |        |      |
|---------------------------|--------|------|--------|--------|--------|------|
|                           | E      | R    | D      | I      | M      | X    |
| ASCII value               | 69     | 82   | 68     | 73     | 77     | 88   |
| Fixed Point uncoded value | −1,564 | −812 | −1,628 | −1,308 | −1,052 | −620 |
| G.711 Encoded             | 69     | 82   | 68     | 73     | 77     | 88   |

Data insertion module 1020 then replaces at least a portion of the data in one of the frames of audio data with the identified uncoded value ("−1,564") of the fixed point under the control of encoding controller 1022 (step 1116), which can select the frame according to any technique, such as those described above.

Lossy encoder 1016 then encodes and transmits the frame to channel 1006 (step 1118). As part of the encoding process, lossy encoder 1016 encodes the passenger data, now represented as "−1,564", as its fixed-point encoded value "69", as shown in Table 4. As Table 4 suggests, using this mapping, there is a simple relationship between each passenger data value and the G.711 encoded value that represents it. When the passenger data value is less than 127 (as are all of the values in Table 4), then the G.711 encoded value is the same as the passenger data value. And when the passenger data value is greater than or equal to 127, the G.711 encoded value is equal to 382 minus the passenger data value.

Figure 12:
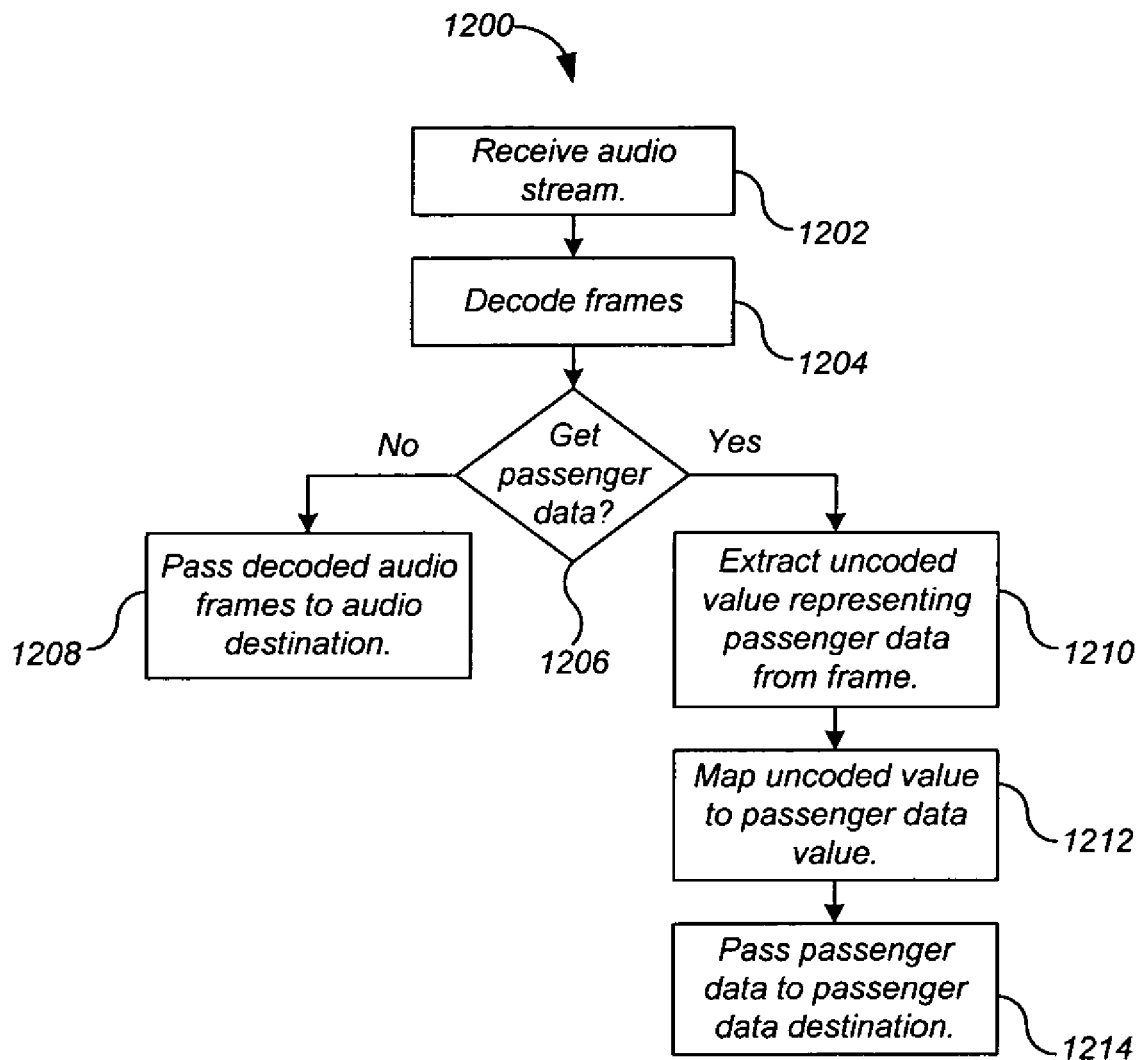
FIG. 12 shows a process for recovering data from an audio stream using a lossy codec having fixed points according to a preferred embodiment of the present invention

FIG. 12 shows a process 1200 for recovering data from an audio stream using a lossy codec having fixed points according to a preferred embodiment of the present invention, and is also described with reference to system 1000 of FIG. 10. The data to be recovered has preferably been inserted into the audio stream using process 1100 of FIG. 11, as described above. While process 1200 is described in terms of inserting passenger data into an audio stream, other embodiments are capable of inserting passenger data into other sorts of data streams, as will be apparent to one skilled in the relevant arts after reading this description.

Receiving module 1004 receives the stream of frames from sending module 1002 (step 1202). The frames comprise audio data and passenger data, for example timestamps, commands, and the like. Lossy decoder 1224 decodes the frames of data (step 1204). Preferably, the frames are decompressed according to the ITU G.711 standard, although other standards can be used instead, such as G.729, MP3, LDP, and the like.

Frames not comprising passenger data (step 1206) are passed to audio data destination 1012 by data recovery module 1228 (step 1208) under the control of decoding controller 1030. Frames comprising passenger data (step 1206) are processed to extract the passenger data. In particular, data recovery module 1228 extracts an uncoded value representing the passenger data from the frame (step 1210) under the control of decoding controller 1030. Reverse mapping module 1026 maps the uncoded value to a passenger data value (step 1212), and passes the passenger data to passenger data destination 1014 (step 1214). Preferably, reverse mapping module 1026 identifies the passenger data, in a reverse map associating each of the uncoded values with a passenger data values, according to the uncoded value recovered from the frame. The reverse map is preferably similar to the example given by Table 3. For example, referring again to Table 4, the uncoded value "−1,564" representing the passenger data "E" is mapped using the reverse map to the passenger data value "69", which is the ASCII value for "E", as shown in Table 4.

Embodiments of the present invention can also insert passenger data into, and recover passenger data from, coded frames, using techniques similar to those described above. For example, to insert passenger data into frame coded by a lossy codec having fixed points, a passenger data value is mapped to one of the fixed points, and the coded value for that fixed point is inserted into the coded frame. To recover passenger data from the frame, the coded value representing a passenger data value in the frame is mapped to one of the fixed points to yield the passenger data value.

Figure 13:
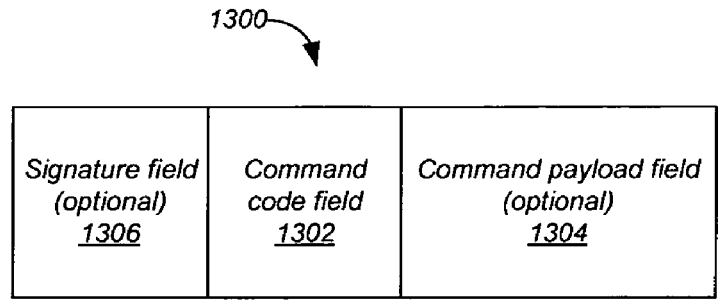
FIG. 13 shows a format of a command frame according to a preferred embodiment.

As mentioned above, passenger data can include any sort of data, for example commands issued to modules in a communication system such as the audio conferencing system discussed above. FIG. 13 shows a format 1300 of a command frame according to a preferred embodiment. Format 1300 defines a command code field 1302, an optional command payload field 1304, and an optional signature field 1306. Optional signature field 1306 can be used to include a signature that identifies the command frame as such, for example so that its contents are not rendered as audio by an audio conferencing system. Table 5 shows some example commands for a system that uses timestamps for delay profiling.

TABLE 5

| Command Code | Meaning |
| --- | --- |
| 0 | Don't modify payload. The payload could be used to hold a sequence number for tracking frames. |
| 1 | Append a timestamp, incrementing a timestamp counter. |
| 2 | Append your device's IP address and increment a counter. Could be used to compute expected number of timestamps and which timestamps correspond to each device. |
| 3 | The payload contains a stage counter, a subcommand, a target stage, and a subcommand payload. Stages other than the target would just increment the stage counter. The target stage would increment the stage counter and obey the subcommand, which could e.g. ask that stage to write the CPU statistics for its process into the subcommand payload. |

In communication systems such as those described above, packet bursts that can overwhelm typical jitter buffer implementations lead to artificial dropping of late data resulting in audio gaps. This can occur, for example, when TCP/IP causes a retransmission of lost packets. After the retried or delayed packet(s) are received, all previously queued packets waiting for their arrival (since order is maintained) are processed immediately. This method favors keeping late audio data by allowing the buffer to fall behind real-time and then 'catch-up' by adjusting the play rate until the play is back real-time.

Embodiments of the present invention manage received audio packet data transported across a network intended for real-time output (i.e. to a soundcard or speaker), and can be implemented as components of conferencing or related communication systems. Embodiments include an adaptive jitter buffer to smooth intra-packet delays and correct packet ordering, loss, late arrival and similar necessary functions. An intelligent controller adapts the audio output rate and buffer size in response to expected or measured data availability to maintain real-time communications. Buffer size is managed to absorb sudden bursts of traffic after packet retransmissions without gaps from typical forced packet dropping/skipping due to buffer overflow handling. Proximity to 'real-time' is continuously measured. Thus, data output rates adapt accordingly to packet bursts and gaps, caused by packet delays and missed or late data, to minimize underflow and overflow conditions and real-time delay.

Embodiments provide an adaptive jitter buffer with an intelligent controller that manages overflow and underflow in a unique manner. It combines the real-time benefits of a jitter buffer method with the anti-loss qualities of a streaming approach by adding a technique to throttle buffer size and output rate to adapt and regain real-time clock. Under this system, keeping pace with real-time is one important factor, but not more important than preserving data from loss. Dropping audio data is highly discouraged and minimized. As a result, embodiments maintain smoother real-time audio playback under a wider range of network congestion conditions. Instead of dropping late packet data or long queuing of all packet data, intelligent handling of surplus packets and data starvation is performed to return rate changes closer to the real-time playback.

When a typical jitter buffers fills to capacity (overflows), it can insert loss into the data stream by dropping the oldest data to make room for the newer incoming data. When late data arrives, for example, in a burst of traffic following a retransmission gap interval (more typical with a TCP/IP transport mechanism), such inserted loss is common. The result is audio playback that sounds choppy. A jitter buffer may adapt over time to correct for common small bursts, but generally cannot adapt to these larger events. Adaptation may also not lend itself to the minimization of end-to-end delay.

In embodiments of the present invention, bursts of data are preserved and late audio is not automatically dropped. The buffer size is instead temporarily enlarged to hold the incoming traffic. As a result, the output/playback may fall behind pace with the 'real-time' communication clock. To correct for this condition and reduce the temporarily enlarged buffer, embodiments manipulate the audio output rate, in effect marking a change in tempo in the playback. The increased rate shrinks the temporary buffer enlargement over time and returns the jitter buffer size and playback delay to real-time proximity.

Some jitter methods use silence detection to reduce enlarging buffers caused by normal network congestion. This type of intelligent packet selection can coexist with embodiments of the present invention.

Real-time audio playback mechanisms also do not stop when data is no longer available (i.e. when the packet delay is enough to deplete the receiver's jitter buffer, underflow). In these cases, something must fill the playback interval. Usually, data representing silence will be played. Comfort noise, tones, or other strategies may be used to fill the data gap. Since it is unknown at the receiver how long the gap will occur, an initial missing packet may be error concealed by repeating the data from the prior interval. As processing time permits, selection of the data to play in this error concealment method may include looking for packet power or aligning packet boundaries such that signal edges are not noticed. Beyond small intervals of time, however, error concealment methods usually decay to simply outputting silence for the gap interval.

Using output rate throttle mechanism according to embodiments of the present invention, yet another technique can be used to control gaps due to missing data. As the buffer size is nearing depletion, the output rate can be slowed, thereby giving a little more time for data to arrive. It cannot do this for long, since real-time requirements do not allow sufficient buffering to allow for long term slow-down. However, it is another method that can be employed to prevent error concealment.

Underflow usually precedes arrival of late data and possible bursts of traffic.

As with other adaptive jitter buffers approaches, packet timing and other network monitoring allows for adjustment to be made to the delay characteristics of the buffer between minimum and maximum range. As an adaptive jitter buffer, this provides protection against general network transmission delays and congestion. In other words, variable intra-packet spacing is smoothed by the jitter buffer.

In embodiments of the present invention, oscillation effects from output rate adjustment during heavy congestion are kept at a minimum and help the jitter buffer adapt to network conditions continually. Thus under heavily congested networks, the real-time performance may lower to near-realtime performance. In experience, receiving delayed not-quite-real-time smooth audio is preferred to receiving choppy, interrupted audio. As network conditions improve, adaptation minimizes delays to improve real-time performance.

The Adaptive Output Rate Controller is the component that throttles the rate of playback of received audio data according to jitter buffer size. It is also responsible for adapting the jitter buffer size for temporary storage of bursts of incoming data. As the buffer nears a maximum assigned capacity, the rate of output or playback is increased to 'drain' the excess content. When the buffer nears empty, the rate of output may be decreased to slow the occurrence of gaps when audio stops arriving as expected. Thus the jitter buffer processing is not only designed to adapt for network intra-packet arrival times, but it is additionally designed to minimize data skipping/loss in overflow conditions. In this way the buffer favors a short-term near-real-time playback over an exclusive real-time mandate. The buffer will grow to allow the audio to fall behind real-time (allow more delay) for brief periods instead of dropping late data that fills a typical jitter buffer due to a burst condition. The buffer will then intelligently catch-up to real-time as data, time, and necessity allow. One result is that the user receives all audio data. However, this means the user may experience some silence delays during congestion and hear slightly faster playback as the rate returns to real-time.

There are several ways to affect output rate, or playback rate. One way is to transcode the audio samples from one sampling rate to another. This, however, could require many computations that may take additional time. Integration with the output hardware (soundcard) clock-rates may be also necessary. Another method is to drop selected audio samples to achieve a desired rate increase, or to replicate selected audio samples or add new samples to cause a rate slowdown. If audio is dropped or replicated in large chunks (long time intervals), then the result will be much more noticeable as portions of words or entire words are lost or duplicated. Embodiments of the present invention favor an approach that drops or replicates a set of small selected samples of very short interval over a limited time period. Dropping small segments over time will result in more physical gaps, but with less content missing. For example, the following illustrates the difference with dropping a large sample at one time vs. several small samples over a longer period.

Original Audio: Parts of this sentence will be dropped.
Dropped (Long Chunk): Parts of this sentence will
Dropped (Segments): Pars ftis sentnc wilb dropd Instant real-time catch-up, which drops large chunks of older packet data as a buffer overflows, has a dramatic effect on received audio. Content is missed. By dropping small bits over time, perceived audio quality is improved. Additionally, instead of dropping samples at a fixed interval, samples can be analyzed to detect silence periods or to remove samples from regions with similar pitch. The same it true for replication to fill gaps. For example, when adding samples, one could add time between sounds (during silence) so that the pattern of speech is preserved. When removing samples, extra time between sounds could be removed.

Intelligent selection of samples that favors dropping silent periods or shortening samples of longer intervals of similar pitch helps to diminish the effect. In the above example, sample size was reduced from words to letters. In practice, audio samples are much smaller and a single sample removal will only reduce a portion of a phoneme. Using the intelligent processing techniques, in addition to removal of a sample, those samples just prior to and just after the sample's removal point could be modified to 'stitch' the pitch to smooth the removal point in the digitized data.

The output rate procedure can be seen similarly to the task of text formatting. Suppose a typesetter wishes to expand a sentence to fit the width of a page. One method is to increase the font's point size. This would be similar to transcoding the text to a slower rate, or playing the text as a slower speed, as all output is affected in equal amounts. Doing so elongates the sounds of each word. Alternately, the typesetter could insert spaces between selected words to justify the text to fit the page. Adding silence (or spaces between words) at the appropriate places merely slows the reader while still keeping the original content intact.

Likewise, a typesetter may removes space between words or decreases the point size to compress the text on the page and speed the reader. In the text example, only so much space can be removed before entire letters and words need to be removed. However, by removing portions of letters (inter character spacing), not whole letters or words, context can still be inferred. Similarly this invention rate controls output by removing selected sample, or portions of the digitized data stream.

Original Sentence: This is a sample sentence.
Save Time (common random drop): Tisssamlesenence.
Save Time (remove selected gaps first): Thsisasamplsntnc.
Save Time (remove samples): This is a sample sentence.

This example assumes each letter is composed of a set of samples. The first example shows a common random drop of sample chunks (full letters here). This method makes the resulting sentence unreadable. The second example shows the same time saving by removing selected sample chunks first, in this case silence gaps between words. Then the method removes short unnecessary selections. The resulting sentence is better, but still incomplete. The last example shows the result of removing a small number of samples from each set. The sentence is still visible. With respect to an audio signal, the resulting audio will sound faster, at an increased tempo, as the sample removal will result in an increase in play rate over the timeframe.

A simplified flow of the audio receiver handling is shown below.

(1) Buffer the minimum amount of data to accommodate for network jitter, packet reordering, etc.

(2) If the buffer becomes empty and data needs to be played, error conceal (based on the last packet played). Continue to play silence for larger gaps.

(3) If a burst of data arrives, expand the current buffer as necessary and begin playing 'late' data at a faster rate to 'catch-up' to real-time (typical buffer time).

(4) Adapt the buffer size to accommodate for typical burst durations to minimize future gaps.

(5) Adapt as network conditions change.

Figure 14:
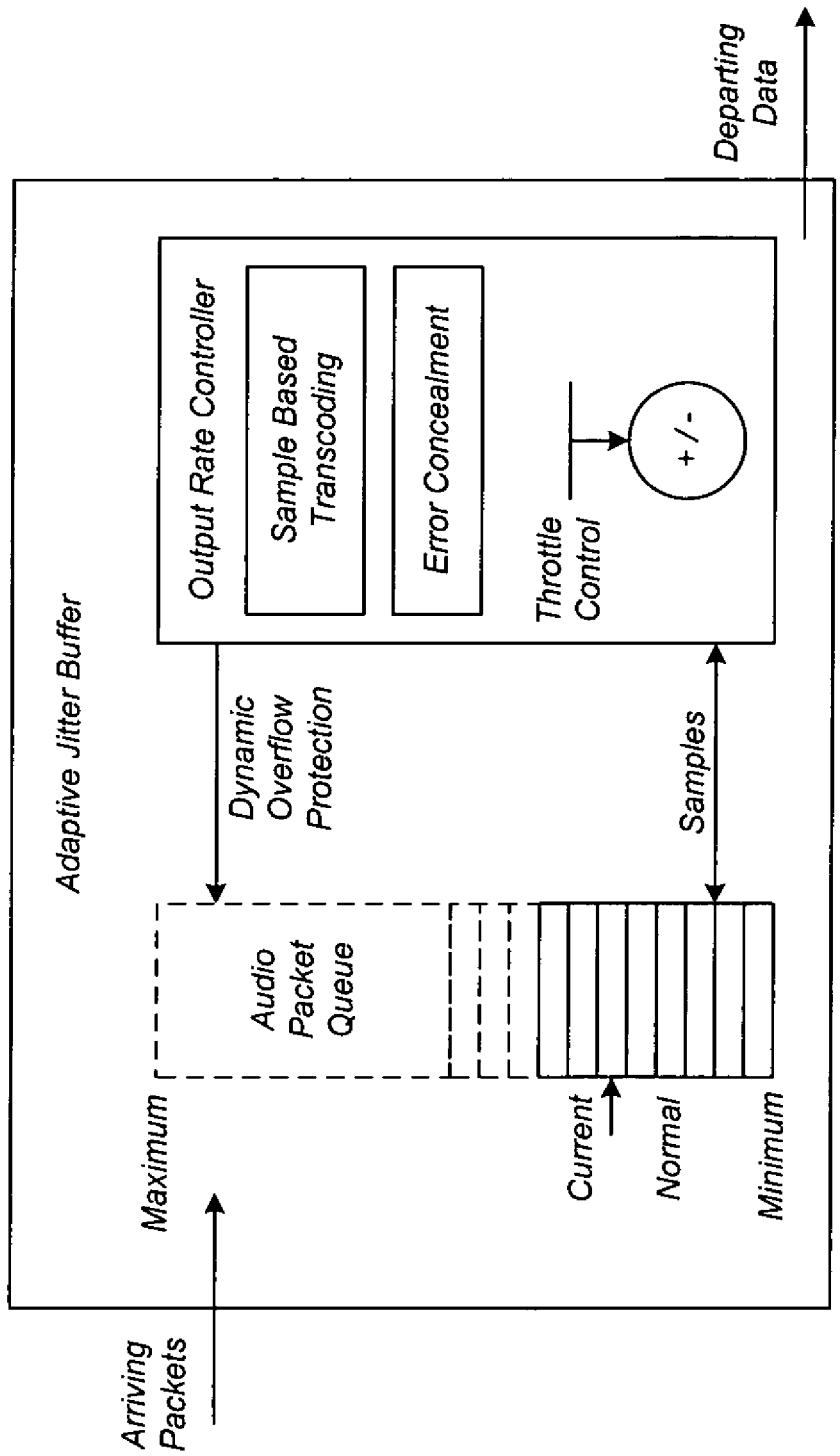
FIG. 14 shows a block diagram of an adaptive jitter buffer according to a preferred embodiment of the present invention.
Figure 15:
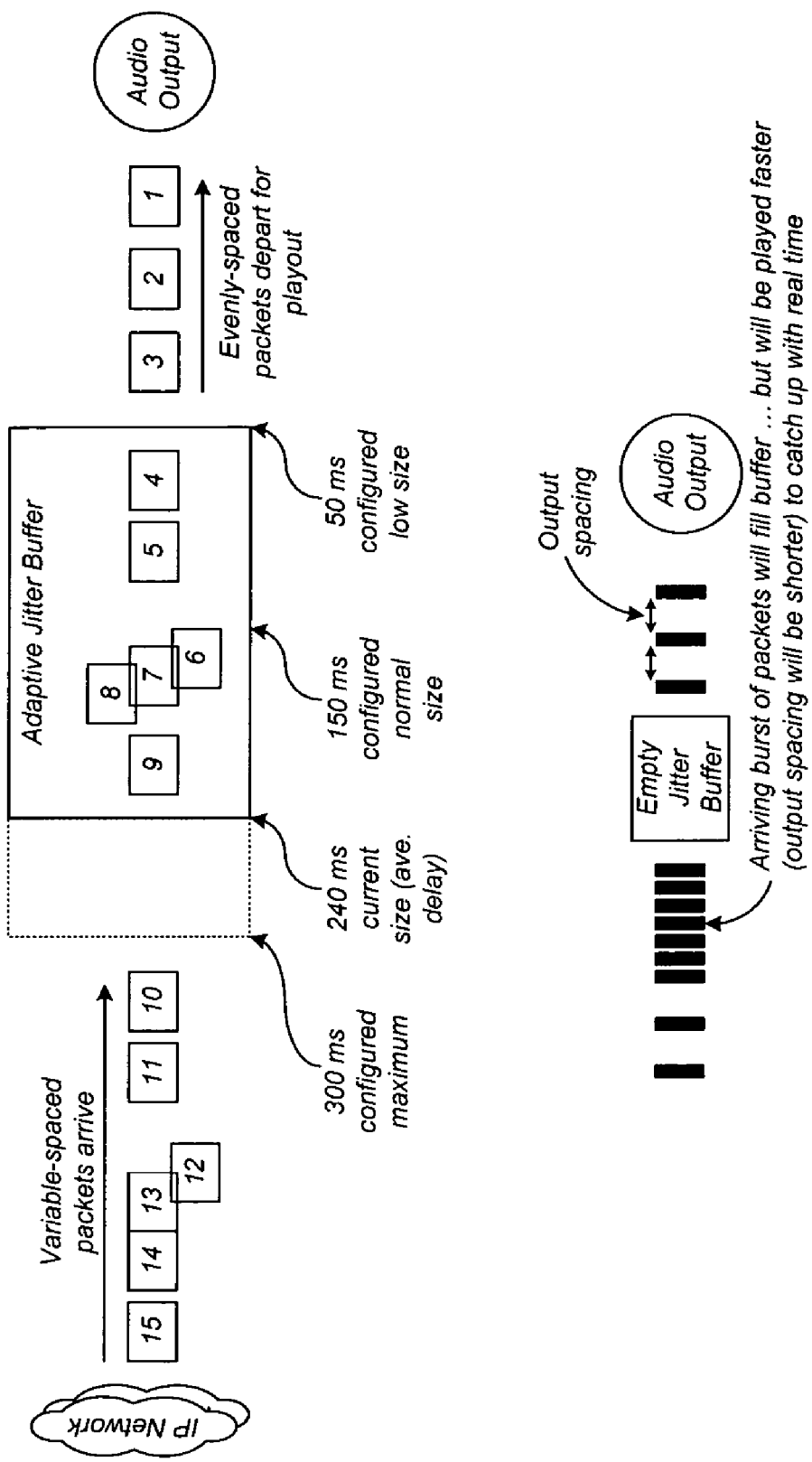
FIG. 15 illustrates an operation of an adaptive jitter buffer according to a preferred embodiment of the present invention.

FIG. 14 shows a block diagram of an adaptive jitter buffer according to a preferred embodiment of the present invention. FIG. 15 illustrates an operation of an adaptive jitter buffer according to a preferred embodiment of the present invention.

The invention can be implemented in digital electronic circuitry, or in computer hardware, firmware, software, a computer-readable storage medium, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices and computer-readable storage media (or a computer-readable storage medium) suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for a communication system comprising a plurality of communication modules passing an audio stream comprising frames of audio data, the method comprising:
   receiving the audio stream at one of the communication modules;
   selecting one of the frames;
   identifying second data;
   replacing a portion of the audio data in the one of the frames with the second data; and
   transmitting the audio stream comprising the one of the frames of audio data comprising the second data from the one of the communication modules in the communication system;
   wherein the second data comprises a timestamp representing a time at which the one of the frames of the audio data is present in the one of the communication modules; and
   wherein at least one of the selecting, identifying, and replacing steps is implemented at least in part by a processor.

2. The method of claim 1, further comprising:
   receiving the audio stream at a further one of the communication modules;
   generating a further timestamp representing a time at which the one of the frames of the audio data in the audio stream is present in the further one of the modules;
   replacing a further portion of the audio data in the one of the frames with the further timestamp; and
   transmitting the audio stream comprising the one of the frames of audio data comprising the timestamp and the further timestamp from the further one of the communication modules.

3. The method of claim 2, further comprising:
   determining a delay for the one of the frames of the audio data based on the timestamp and the further timestamp.

4. The method of claim 1, further comprising:
   encoding the audio stream, comprising
   receiving each of the frames at an encoder,
   generating coded frames based on the frames, comprising
   generating compressed frames of the audio data each having a predetermined size, comprising compressing the frames of the audio data, other than the one of the frames comprising the second data, and
   reducing the size of the one of the frames comprising the second data to the predetermined size, comprising discarding data, other than the second data, from the one of the frames comprising the second data, and then
   transmitting each of the coded frames from the encoder a predetermined interval after receiving the frame at the encoder.

5. The method of claim 1, further comprising:
   decoding the audio stream, comprising
   receiving each of the frames at a decoder,
   generating uncoded frames based on the frames, comprising
   generating decompressed frames of the audio data each having a predetermined size, comprising decompressing the frames of the audio data, other than the one of the frames comprising the second data, and
   increasing the size of the one of the frames comprising the second data to the predetermined size, comprising adding data to the one of the frames comprising the second data, and then
   transmitting each of the uncoded frames from the decoder a predetermined interval after receiving the frame at the decoder.

6. The method of claim 1, further comprising:
   generating the second data comprising
   identifying third data,
   selecting a coded value of one of a plurality of fixed points of a lossy codec according to a value of the third data, wherein the lossy codec has a plurality of the fixed points each associating one of the coded values with one of a plurality of uncoded values, and
   assigning, to the second data, the uncoded value of the one of the plurality of fixed points;
   wherein the frames are subsequently encoded by an instance of the lossy codec.

7. The method of claim 6, further comprising:
   encoding the frames of audio data using the instance of the lossy codec.

8. The method of claim 1, further comprising:
   generating the second data comprising
   identifying third data,
   selecting an uncoded value of one of a plurality of fixed points of a lossy codec according to a value of the third data, wherein the lossy codec has a plurality of the fixed points each associating one of the uncoded values with one of a plurality of coded values, and
   assigning, to the second data, the coded value of the one of the plurality of fixed points;
   wherein the frames are subsequently decoded by an instance of the lossy codec.

9. The method of claim 8, further comprising:
   decoding the frames using the instance of the lossy codec.

10. An apparatus to perform the method of claim 1.

11. A computer-readable storage medium having a program of instructions for directing a computer to perform the method of claim 1.

12. A method comprising:
    receiving a data stream comprising frames of first data;
    identifying second data;
    selecting an uncoded value of a fixed point of a lossy codec, wherein the lossy codec has a plurality of the fixed points each associating one of a plurality of the uncoded values with one of a plurality of coded values, according to a value of the second data and a map associating each of a plurality of possible values of the second data with one of the uncoded values;

replacing at least a portion of the first data in one of the frames with the selected uncoded value;

wherein the frames are subsequently encoded by an instance of the lossy codec;

wherein at least one of the identifying, selecting, and replacing steps is implemented at least in part by a processor.

13. The method of claim 12:

wherein the frames of the first data have been decoded by a further instance of the lossy codec before receiving the frames of the first data.

14. The method of claim 12, further comprising:

encoding the frames using the instance of the lossy codec.

15. The method of claim 12, further comprising:

decoding the frames using a further instance of the lossy codec; and recovering the second data, comprising recovering the uncoded value from the one of the first frames, and identifying the second data, in a further map associating each of the uncoded values with one of a plurality of data values, according to the uncoded value recovered from the one of the first frames.

16. An apparatus to perform the method of claim 12.

17. A computer-readable storage medium having a program of instructions for directing a computer to perform the method of claim 12.

18. A method comprising:

receiving a data stream comprising frames of first data;

identifying second data;

selecting a coded value of a fixed point of a lossy codec, wherein the lossy codec has a plurality of the fixed points each associating one of a plurality of the coded values with one of a plurality of uncoded values, according to a value of the second data and a map associating each of a plurality of possible values of the second data with one of the coded values;

replacing at least a portion of the first data in one of the frames with the selected coded value;

wherein the frames are subsequently decoded by an instance of the lossy codec; and wherein at least one of the identifying, selecting, and replacing steps is implemented at least in part by a processor.

19. The method of claim 18:

wherein the frames of the first data have been encoded by a further instance of the lossy codec before receiving the frames of the first data.

20. The method of claim 18, further comprising:

decoding the frames using the instance of the lossy codec.

21. The method of claim 18, further comprising:

encoding the frames using a further instance of the lossy codec; and recovering the second data, comprising recovering the coded value from the one of the first frames, and identifying the second data, in a further map associating each of the coded values with one of a plurality of data values, according to the coded value recovered from the one of the first frames.

22. An apparatus to perform the method of claim 18.

23. A computer-readable storage medium having a program of instructions for directing a computer to perform the method of claim 18.

* * * * *